Feb. 23, 1932.    C. M. HICKEY    1,846,331
SAW SHARPENING DEVICE
Filed Oct. 30, 1929    4 Sheets-Sheet 1
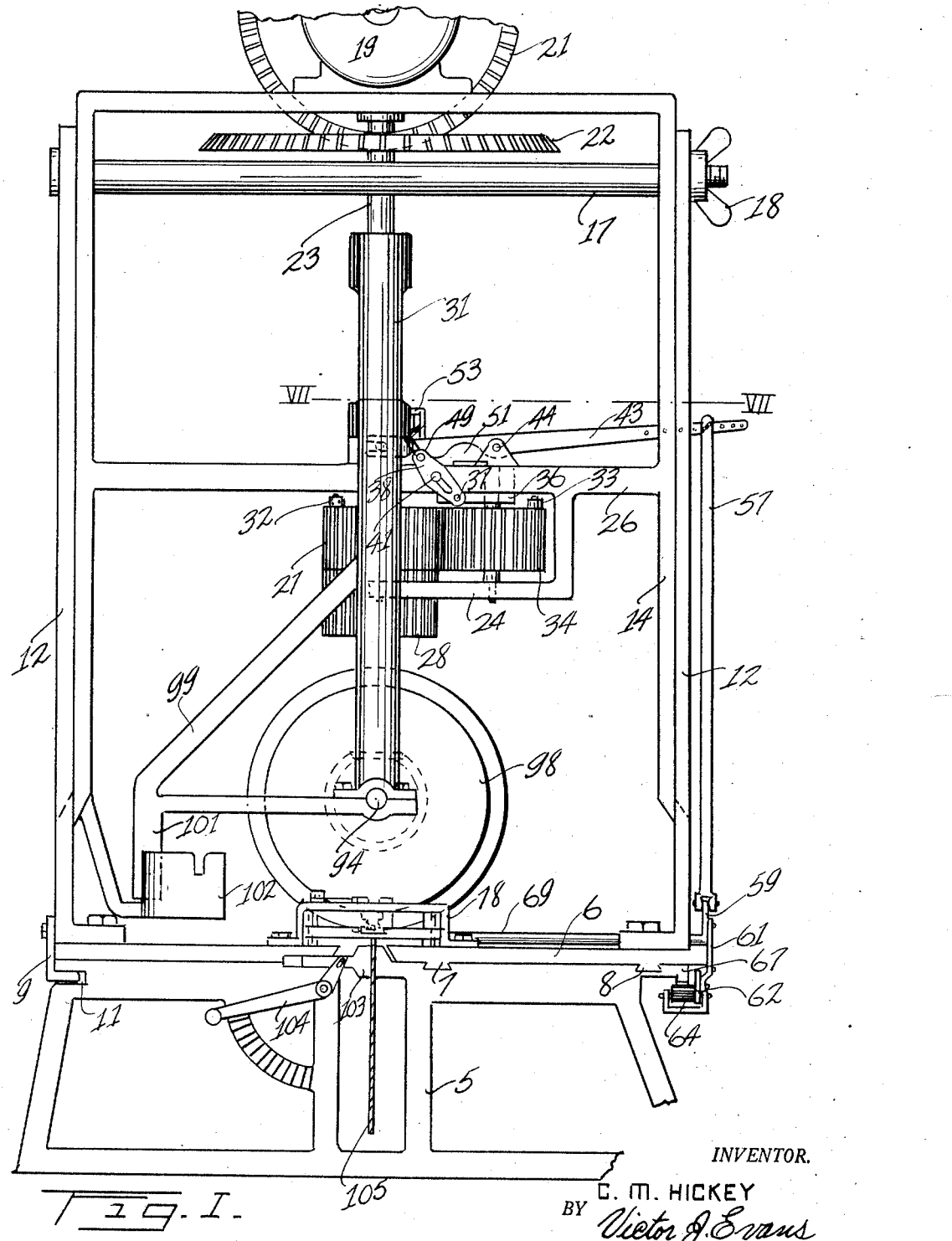
Fig. I.
INVENTOR.
C. M. HICKEY
BY Victor J. Evans
ATTORNEY.

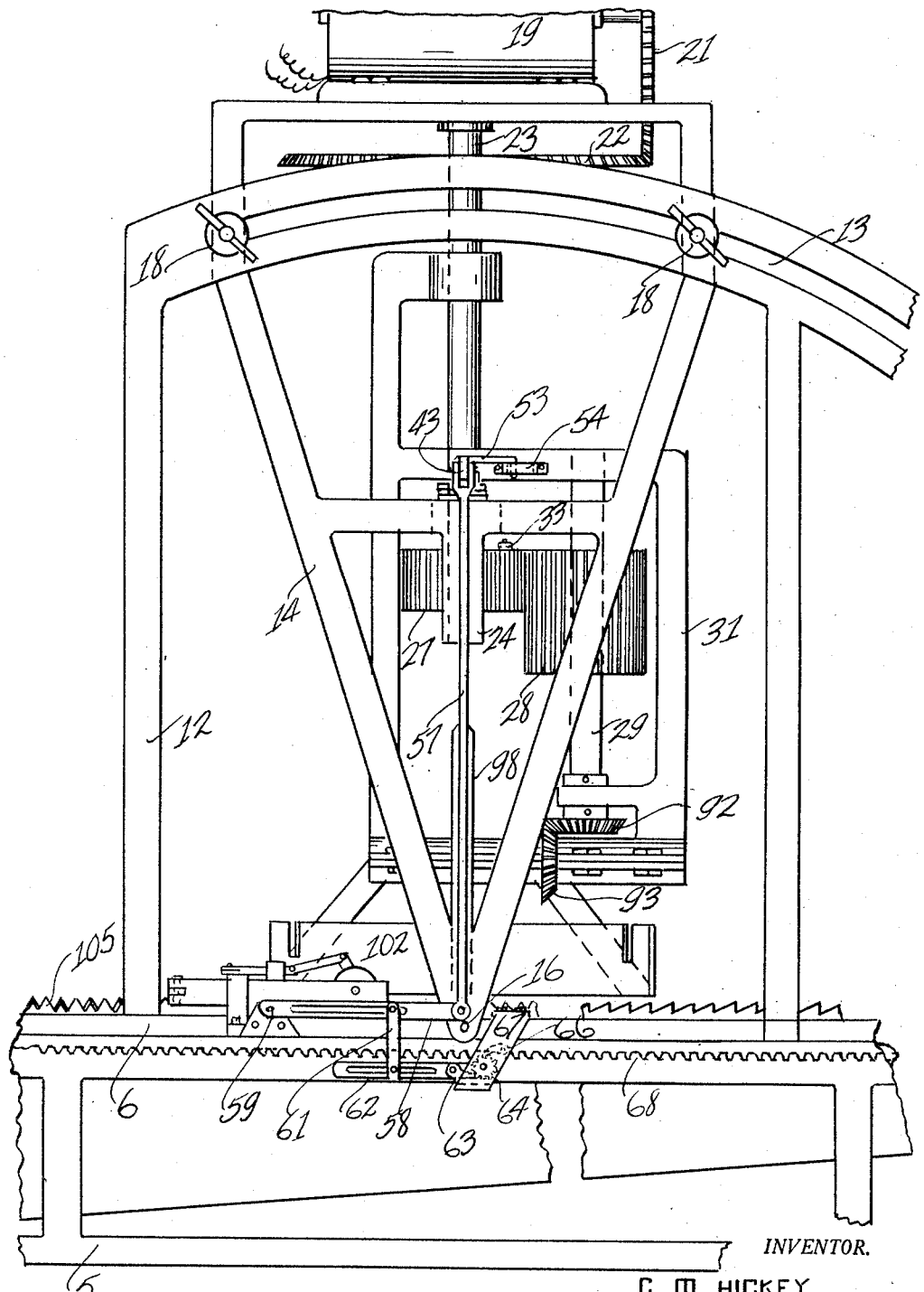

Feb. 23, 1932. C. M. HICKEY 1,846,331
SAW SHARPENING DEVICE
Filed Oct. 30, 1929 4 Sheets-Sheet 3
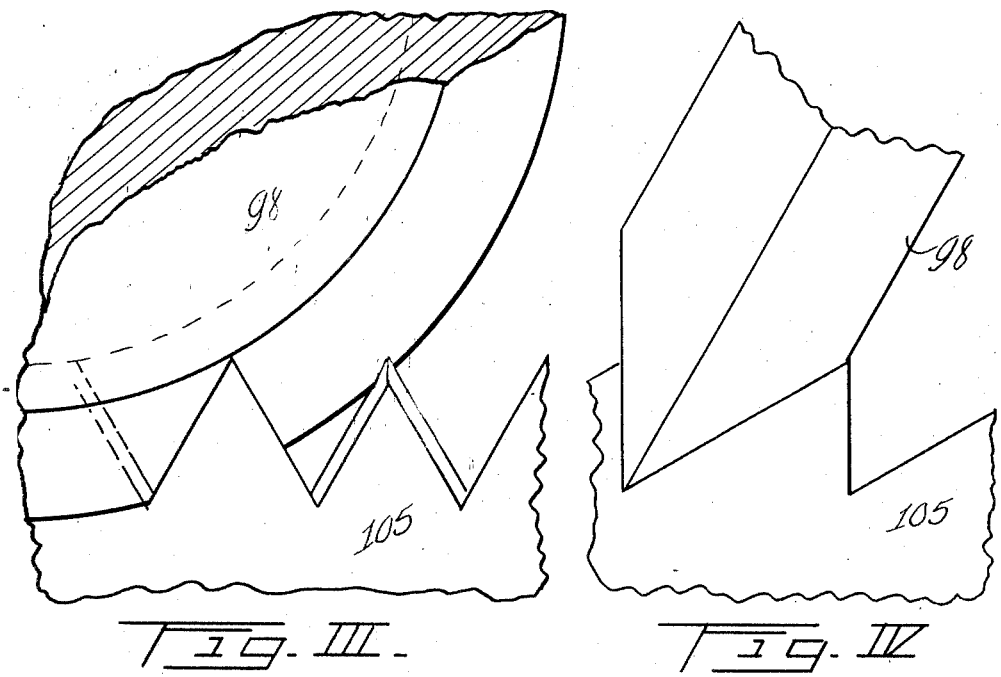
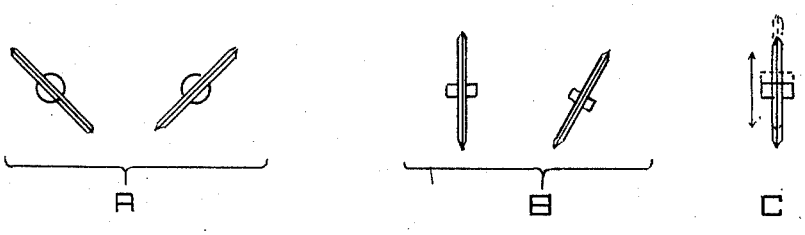
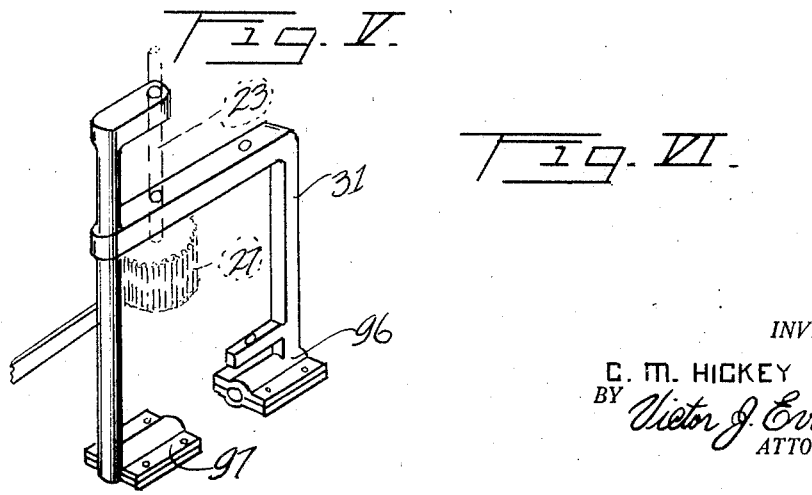
INVENTOR.
C. M. HICKEY
BY *Victor J. Evans*
ATTORNEY.

Feb. 23, 1932.   C. M. HICKEY   1,846,331
SAW SHARPENING DEVICE
Filed Oct. 30, 1929   4 Sheets-Sheet 4
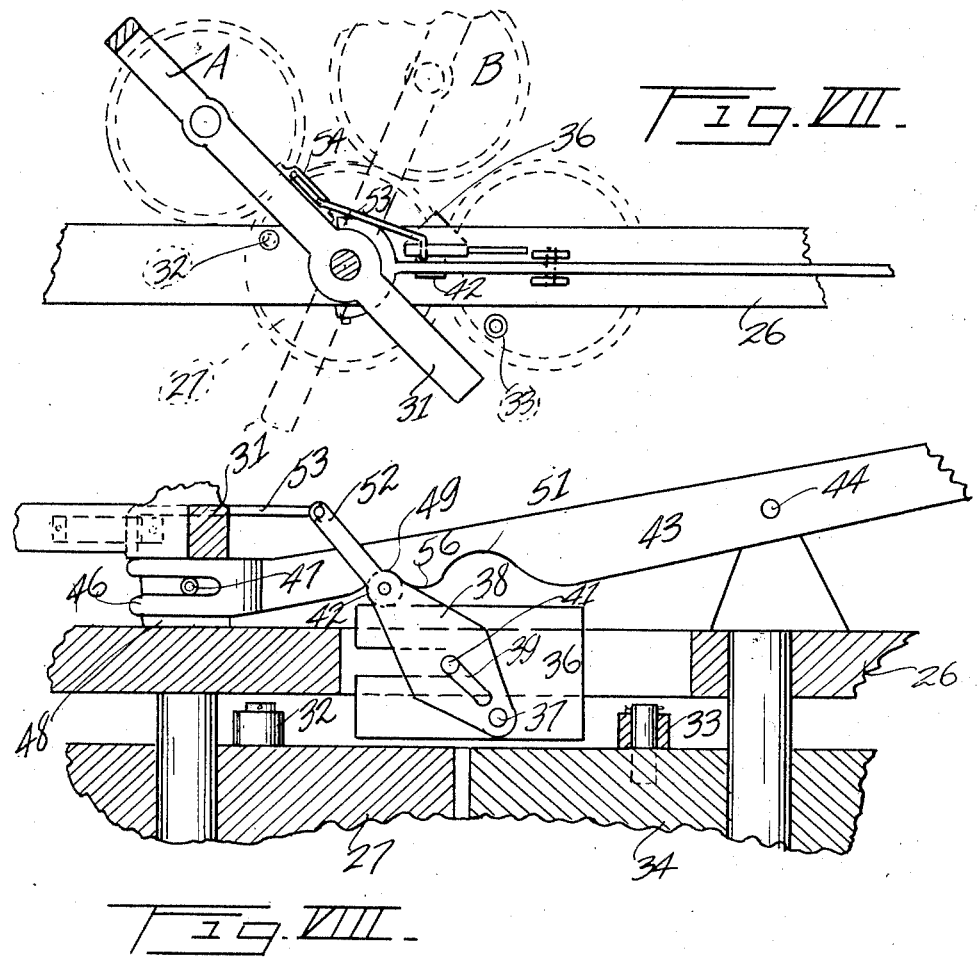
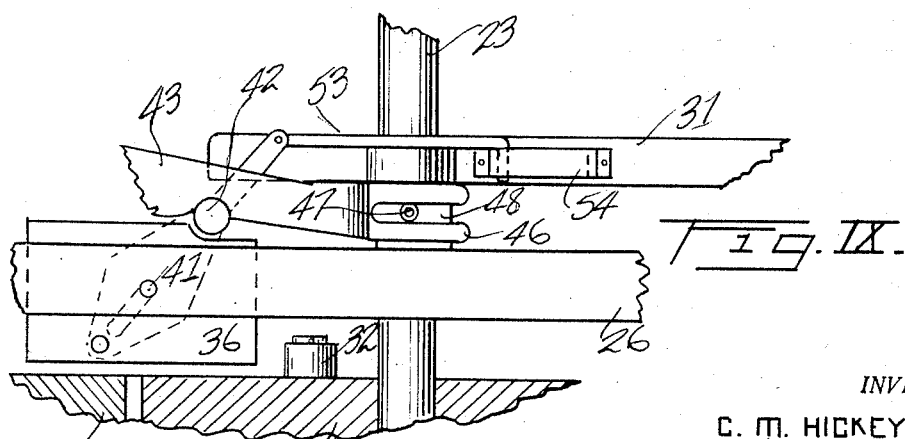
INVENTOR.
C. M. HICKEY
BY Victor J. Evans
ATTORNEY.

Patented Feb. 23, 1932

1,846,331

UNITED STATES PATENT OFFICE

CHARLES M. HICKEY, OF SAN FRANCISCO, CALIFORNIA

SAW SHARPENING DEVICE

Application filed October 30, 1929. Serial No. 403,574.

This invention relates to improvements in saw filing and setting machines.

The principal object of the invention is to provide a saw filing and setting machine which is automatic in operation in that the saw is merely clamped in position and the machine started, after which each tooth of the saw will be sharpened and set without further attention from the operator of the machine.

Another object of the present invention is to produce a device which will sharpen either a cross-cut saw or a rip saw, irrespective of whether they are hand saws or band saws.

A further object is to produce a device of this character which is simple in construction, and therefore one wherein the parts will not become easily dearranged.

A still further object is to produce a device which may be operated by an unskilled person.

Other objects and advantages will be apparent during the course of the following description.

In the accompanying drawings forming a part of this specification and in which like numerals are employed to designate like parts throughout the same, Figure I is an end elevation of my device, Figure II is a side elevation of Figure I, Figure III is an enlarged fragmentary detail view showing the position of the sharpening element with relation to a cross-cut saw, Figure IV is a similar view showing the position of the sharpening element with relation to a rip saw, Figure V is a diagrammatic illustration of the various positions to which the sharpening element may be turned, Figure VI is a perspective view of the floating frame of the sharpening element, Figure VII is a fragmentary detail view showing the manner in which the driving gears are actuated, Figure VIII is an enlarged detail fragmentary view showing the elevating and rotating mechanism, Figure IX is a fragmentary detail view showing the elevating and turning mechanism from the opposite side of that shown in Figure VIII.

In sharpening saws, it is necessary to first file each individual tooth of the saw and in some instances it is necessary to offset various teeth first to one side of the saw and then to the opposite side, which offset is commonly termed "setting" the teeth. This is usually accomplished through the use of a hand setting device which is placed over each tooth and then the set is operated in a manner similar to a pair of pliers.

I have devised a machine wherein a saw is clamped in a position parallel with the bed of my machine after which a sharpening element, which may be a rotary file, a grinding wheel or any other suitable device, is caused to drop into engagement with the tooth of the saw to be worked up so as to sharpen the saw tooth, thereafter elevated, moved over the distance of one tooth, dropped into the next succeeding tooth which is then sharpened and in this manner a progressive sharpening of each tooth is accomplished.

If it is the type of saw requiring a setting at each movement of the sharpening element from one tooth to the next, a saw set is moved progressively along the saw and is caused to engage and bend or offset the tooth or teeth which have been sharpened. This is accomplished in the following manner:—

Referring to the drawings, the numeral 5 designates a base which may be of any desired construction, the same serving to support a sliding bed plate 6 held in sliding engagement with the base 5 as by dove-tailed connections 7 and 8 and against tipping by a lug 9 having an inturned end which moves in a slot 11 formed in the base 5.

Carried upon the bed plate 6 is a guide frame 12, which has an arcuate-shaped slot 13 formed in its upper portion. Positioned between the opposite sides of the guide frame 12 is a supporting frame 14 pivoted as at 16 to the bed plate 6.

Tie bars 17 are carried by the frame 14 and extend through the slots 13 of the guide frame 12, the result being that when the wing nuts 18 are tightened the supporting frame will be locked to the guide frame.

The supporting frame carries upon its upper end a motor 19, to which a gear 21 is secured and adapted to be rotated thereby. This gear meshes with a gear 22 mounted upon a shaft 23, the upper end being journaled in the frame 14 and the lower end being journaled in an offset arm 24 formed upon a cross bar 26.

This shaft carries a gear 27 which is in constant mesh with a gear 28 mounted upon the shaft 29. This shaft 29 is journaled in the floating frame 31 which is adapted to move up and down upon the shaft 23, the same being accomplished through the medium of rollers 32 and 33, the roller 32 being mounted upon the top of the gear 27 and the roller 33 being mounted upon a gear 34 journaled between the offset arm 24 and the cross bar 26. (See Figures VII, VIII and IX for detail construction.)

These rollers are adapted to alternately engage cam faces of a sliding block 36, slidably carried on the cross bar 26. This block has pivoted thereto as at 37 a walking beam 38 provided with a slot 39 through which a pin 41 passes. This pin is held in the cross bar 26.

The upper end of the walking beam is provided with a roller 42 which engages the under surface of the rocker arm 43 fulcrumed as at 44 and having a forked extremity 46 in which rollers 47 are positioned. These rollers are carried in a collar 48 positioned beneath a portion of the floating frame 31.

The roller 42 is adapted to normally lie in either of the depressions 49 and 51 of the rocker arm 43, the purpose of which will be later seen.

The walking beam 38 has a lever 52 formed integral therewith, to which is pivoted a link 53 having its free end slidably held in a bracket 54 secured to the side of a portion of the floating frame 31.

The result of this construction is that as the walking beam is moved, the floating frame will be swung either to the position A of Figure VII or to the position B, depending upon the direction of movement of the sliding block 36. At the same time, the movement of the walking beam will first raise the floating frame through the action of the roller passing under the hump 56, and will then drop it as the roller passes into the depression 51. Consequently, the movement of the block 36 through the action of the rollers 32 and 33 will result in an up and down movement of the floating frame as well as a turning movement about its vertical axis.

The rocker arm 43 has connected to its opposite end a link 57 through the medium of adjusting holes and a suitable pin. This means of connection permits of adjusting the amount of stroke of the link 57.

The lower end of this link is pivoted to a pivoted link 58 fulcrumed as at 59 to the bed of the machine. A connector 61 is slidably secured in the pivoted link 58 and has its lower end adjustably secured to a pivoted member 62 to which is secured a dog 63 which engages a ratchet 64 held against retrograde movement by a dog 66. This ratchet 64 is carried upon a bracket 67 secured to the bed plate 6 and meshes with a rack bar 68 formed upon the base 5.

Referring now to Figures I, II and VI, it will be noted that the shaft 29 has a gear 92 which in turn meshes with a gear 93 carried upon a shaft 94 journaled in the journals 96 and 97 of the floating frame 31 (see Fig. 6). Upon this shaft and between the journals is positioned a rotary file 98 which is in continual rotation during the entire operation of the machine. A bracket 99 is formed upon the floating frame having a forked extremity 101 adapted to engage slots formed in a segment 102 supported by the supporting frame 14.

In order to clamp the saw any convenient means may be employed.

In Figure 2, I have shown two types of saws, namely, a rip saw on the right of the drawing and a cross-saw to the left of the drawing, thus illustrating that either type of saw may be positioned in the same machine.

Referring now to Figure V, A shows the sharpening element in two positions, ninety degrees apart as the same would be employed in sharpening a cross-cut saw, while B shows the position of the sharpening element illustrating the manner in which the sharpening element may be tipped from a horizontal axis to an inclined axis of rotation, and C illustrates the manner in which the sharpening element may be raised or lowered for the purpose of passing from one tooth of the saw to the next.

The operation of my device is as follows:—

Assuming that it is desired to sharpen the rip saw, the wing nuts 18 are loosened and the supporting frame is swung so as to move the sharpening element on an angle as shown in Figure IV. The link 53 is disconnected so as to prevent oscillation of the floating frame. By now starting the motor 19, the sharpening element 98 will be rotated through the gears 21, 22, shaft 23, gears 27 and 28, shaft 29, gears 92 and 93. The last mentioned gear rotating the shaft about which the sharpening element is secured.

As the gears 27 and 34 rotate the rollers 32 and 33 will be successively brought into engagement with the sliding block 36. This will cause the walking beam 38 to move the lever 43 up and down and during the upward movement the action of the forked end 46 will cause the floating frame to be raised thus raising the cutting element out of engagement with the teeth of the saw.

At the same time downward movement of the link 57 will actuate through the various connections the ratchet 64, thus moving the bed plate along the base until the sharpening element is above the next tooth of the saw. Consequently, on the downward movement of the forked end of the lever 43, the sharpening element will be dropped into the next tooth of the saw.

When sharpening a cross-cut saw the operation will be identical with that described with the exception that the supporting frame will be maintained in a vertical position as shown in Figure II, the link 53 will be connected as well as the saw set will be thrown into operation.

As a result at each up and down movement of the floating frame, the link 53 will swing the floating frame first to the position A, then to the position B of Figure VII so that the cutting element will pass over the saw diagonally.

As a result of this arrangement when the motor is started the sharpening element is first swung to one diagonal position and rotated, then raised, moved to the opposite diagonal and dropped into the next successive tooth. At the same time the tooth already sharpened will be properly set.

It is to be understood that the form of my invention herewith shown and described is to be taken as a preferred example of the same and that various changes relative to the shape, size, material and arrangement of parts may be resorted to without departing from the spirit of the invention or the scope of the subjoined claims.

Having thus described my invention, I claim:—

1. In a saw sharpening device, a base, a bed plate movable on said base, a guide frame carried on said bed plate, means for holding a saw in said base and having its teeth project through said bed plate, a supporting frame pivoted to said bed plate, means for holding said supporting frame in fixed position, a shaft vertically disposed in said supporting frame, gearing connected to said shaft, means for rotating said shaft, a sharpening element adapted to be actuated by said gearing, a floating frame supporting said sharpening element, means for raising and lowering said supporting frame, said means comprising a lever having one end actuated by said gears for successively raising and lowering said lever and a link interposed between said lever and said floating frame whereby said frame may be oscillated on its vertical axis.

2. In a saw sharpening device, a base, a bed plate movable on said base, a guide frame carried on said bed plate, means for holding a saw in said base and having its teeth project through said bed plate, a supporting frame pivoted to said bed plate, means for holding said supporting frame in fixed position, a shaft vertically disposed in said supporting frame, gearing connected to said shaft, means for rotating said shaft, a sharpening element adapted to be actuated by said gearing, a floating frame supporting said sharpening element, means for raising and lowering said supporting frame, said means comprising a lever having one end actuated by said gears for successively raising and lowering said lever and a link interposed between said lever and said floating frame whereby said frame may be oscillated on its vertical axis and a link connected to said lever, said link being adapted to actuate a ratchet mechanism for the purpose of advancing said sharpening element from tooth to tooth of the saw.

3. A saw sharpening device, a base, a bed plate movable on said base, a frame carried by said bed plate and adapted to move therewith, a supporting frame pivotally secured to said bed plate, means for locking said pivoted frame, means for rotating said shaft, a gear mounted on the lower extremity of said shaft, a floating frame slidably and pivotally mounted on said shaft, a gear mounted in said floating frame and meshing with said first mentioned gear, a sharpening element adapted to be rotated by said second mentioned gear, rollers carried on said first mentioned gear and said second mentioned gear, a sliding block supported on said pivoted supporting frame, a pivoted lever mounted on said supporting frame, a walking beam pivoted to said block, a roller mounted on said walking beam and adapted to contact the undersurface of said lever, a link connecting said walking beam to said floating frame and a forked extremity formed on said lever and engaging the rollers positioned beneath said floating frame whereby when said block is actuated, said lever will be given up and down movement and said floating frame will be moved about its vertical axis for the purpose specified.

In testimony whereof I affix my signature.

CHARLES M. HICKEY.